(12) United States Patent
Molnar et al.

(10) Patent No.: US 8,041,147 B2
(45) Date of Patent: Oct. 18, 2011

(54) METHOD FOR REALISTIC STITCHING IMAGE BLOCKS OF AN ELECTRONICALLY RECORDED MULTIPART IMAGE

(75) Inventors: Bela Molnar, Budapest (HU); Viktor Sebestyen Varga, Budapest (HU); Attila Tagscherer, Tiszadorogma (HU); Gabor Csendes, Szigetcsep (HU)

(73) Assignee: 3DHISTECH Kft;, Budapest (HU)

( * ) Notice: Subject to any disclaimer, the term of this patent is extended or adjusted under 35 U.S.C. 154(b) by 1035 days.

(21) Appl. No.: 11/826,752

(22) Filed: Jul. 18, 2007

(65) Prior Publication Data

US 2009/0022419 A1    Jan. 22, 2009

(51) Int. Cl.
*G06K 9/36* (2006.01)
(52) U.S. Cl. .................. 382/284; 382/232; 382/294
(58) Field of Classification Search .............. 382/284
See application file for complete search history.

(56) References Cited

U.S. PATENT DOCUMENTS

| 6,456,323 | B1 * | 9/2002 | Mancuso et al. | 348/218.1 |
| 6,697,532 | B1 * | 2/2004 | Demko et al. | 382/249 |
| 2005/0152608 | A1 * | 7/2005 | Niemi et al. | 382/232 |
| 2005/0180656 | A1 * | 8/2005 | Liu et al. | 382/284 |
| 2006/0072851 | A1 * | 4/2006 | Kang et al. | 382/294 |
| 2006/0083307 | A1 * | 4/2006 | Chi | 375/240.16 |

* cited by examiner

*Primary Examiner* — Hadi Akhavannik
(74) *Attorney, Agent, or Firm* — Davidson Berquist Jackson & Gowdey, LLP

(57) ABSTRACT

A method for realistic stitching and showing image blocks of an electronically recorded multipart image wherein relative positional offset values of the image blocks recorded with overlap are determined in a co-ordinate system in directions x and y and stored in matrix format, and the image blocks to be presented are stitched together on the basis of the stored values the method comprising: subdividing the overlaps of the individual image blocks into smaller regions with fixed relative positions; picking up at least one region most useful for the determination of the stitching; determining the offset goodness value based on the similarity of pattern of the image blocks; stitching the blocks of the image so that first the two image blocks characterized by the best offset goodness values are stitched together and the two image blocks characterized by the worst offset goodness values are stitched together last, whereas only the co-ordinates of the images figuring in a table are modified in the course of the stitching process; and distributing the errors produced by the stitching process over several image blocks.

22 Claims, 2 Drawing Sheets

METHOD FOR REALISTIC STITCHING IMAGE BLOCKS OF AN ELECTRONICALLY RECORDED MULTIPART IMAGE

BACKGROUND AND SUMMARY

Present application relates to a method for realistic stitching and showing image blocks of an electronically recorded multipart image wherein relative positional offset values of the image blocks recorded with overlap are determined in a co-ordinate system in directions x and y and stored in matrix format, and the image blocks to be presented are stitched together on the basis of the stored values.

In the area of electronic image recording, one frequently encounters the need to show image parts that can be recorded/scanned in several parts only due to their size in a realistic manner and with adequate speed. By way of example, one such priority area is photography, the recording of panoramic images, virtual microscopy being another professional application area. In the latter field, several proposals have been released lately as to advantageous methods for stitching together individual image parts and expedient methods for showing these to the user or transmitting them in case of remote utilisation.

US 2006/0045388 A1 proposes several systems and methods for stitching image blocks, to create seamless magnified images of a microscope slide. In a microscopy system, several digital image block regions are defined for every actual, physical, slide, and the slide is scanned/electronically recorded by region; the recorded image parts are stored with a positional index metric associated to each image's location in a mosaic representation of the entire physical slide; a normalised correlation search is performed on the adjoining areas of next neighbour regional image blocks; a set of relative positional offset values and a correlation coefficient is determined for a regional image block and a next neighbour regional image block; a portion of the regional image blocks is viewed as a field of view of a display, and a composite of the portion of regional image blocks is stitched together in accord with a set of relative positional offset values and a correlation coefficient, such that only the blocks comprising the portion are stitched.

One drawback of this solution is that matching/stitching is applied exclusively to the image blocks being shown, at the moment of showing them. Normalised correlation search between 2-2 image blocks is unacceptably slow and does not yield optimum result, due to the confusing interference of larger-size, empty, but noisy, areas.

An object of the present invention is to develop a solution whereas the entire slide image can be stitched together from the image blocks in a short time, at low computing capacity demand and in excellent quality, given the demand for remote retrievals and related data transmission problems, cf. bandwidth.

We have realised that the efficiency of image stitching and transmission as well as the quality of the images themselves can be enhanced significantly by selecting small but very high-quality image blocks, and constructing the image of the slide around them and, furthermore, by performing the various operations not on the large-size image blocks themselves, but on their descriptors only.

According to a first aspect of the invention a method is proposed for the realistic stitching and showing of image blocks of an image recorded electronically, in several parts, whereas the relative positional offset values of the image blocks recorded with overlap are determined in a co-ordinate system, in directions x and y, and stored in matrix format, and the image blocks to be shown are stitched together on the basis of the stored values. According to the invention, the overlaps between the individual image blocks are subdivided into smaller regions; at least one region most useful for determining the stitching is identified; on the basis of the regions, a main offset direction vector is defined in correlation with the relative positional offset value; in addition to the relative positional offset value, an offset goodness value is defined as well; the blocks of the image are stitched together so that the two image block edges characterised by the best offset goodness values are stitched together first, and the two image block edges characterised by the worst offset goodness values are stitched together last, whereas, in the course of the stitching, only the image coordinates figuring in a matrix are modified; and any errors generated at the joins are distributed over several image blocks.

According to a second aspect of the invention a method is proposed for realistic stitching and showing image blocks of an electronically recorded multipart image whereas relative positional offset values of the image blocks recorded with overlap are determined in a coordinate system in directions x and y and stored in matrix format, and the image blocks to be shown are stitched together on the basis of the stored values. The method can, for example, include the steps of subdividing the overlaps of the individual image blocks into smaller regions with fixed relative positions; picking up at least one region most useful for the determination of the stitching; determining the offset goodness value based on the similarity of pattern of the image blocks; stitching the blocks of the image so that first the two image blocks characterised by the best offset goodness values are stitched together and the two image blocks characterised by the worst offset goodness values are stitched together last, with only the co-ordinates of the images figuring in a table being modified in the course of the stitching process; and distributing the errors produced by the stitching process over several image blocks.

Further advantageous embodiments of the invention are specified in the appended dependent claims.

DESCRIPTION OF THE DRAWINGS

These and other features, aspects and advantages of the present invention will be more apparent when considered in connection with the following specification, appended claims and accompanying drawings, wherein:

DETAILED DESCRIPTION OF AN EXEMPLARY EMBODIMENT

The following is a description of a possible embodiment of the method according to the invention, by no means restrictive, example. In doing so, it shall be presumed that the image has already been recorded by one of the methods known in the art, that is, it has been recorded electronically in several blocks, and the image blocks have been stored on a data storage medium of some sort, such as a magnetic or optical background storage device. As a first step of the method, the relative positional offset value of the adjoining edges of two image blocks 1, 2 will be calculated.

Figure 1:
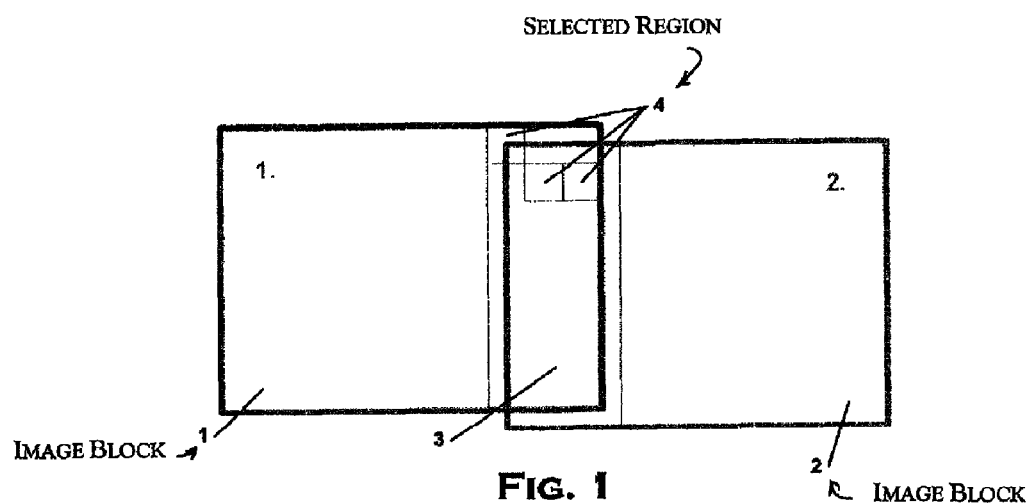
FIG. 1 shows two partly overlapping image blocks and the regions selected within them.

Two image blocks 1, 2 shall be recorded in partial overlap. Image blocks 1, 2 usually over-lap on all four sides, but FIG. 1 shows two only of these. The size of overlapping area 3 is known in advance, as we determine it ourselves at the time of the electronic input of the image, most often scanning. The overlap in the first image block 1 is subdivided into 4 regions. In the present example, these are squares, the size of which depend on the given optical resolution, but are preferably between 16×16 and 64×64 pixels, growing by eight pixels.

From among the squares generated this way, we select three regions 4 offering the highest-definition image blocks. In order to do so, in the case presented here, it is advantageous to calculate the definition of every region 4. Definition is calculated, for example, in the known manner, as in the case of focussing. The intensity values of adjoining pixels are subtracted from one another, the absolute value of the result is taken, and then the absolute values are added up. The richer the details of image blocks 1, 2, the higher the resulting sum total. In function of optical resolution, calculation will not necessarily be based on the next-neighbour pixel—it may be based on one several pixels away.

The three squares selected this way are searched out in the overlapping area of the second, neighbouring image block 2. That is, the squares are compared one by one with image block 2 in every possible pixel position. Comparison is based on the sum of the absolute values of the pixel differences. The square will fit best at the point where the difference is the smallest.

In the course of this process, according to a possible variant of the method according to the invention, one may perform an optimisation, that is, instead of going through every pixel position, look at every even number only in directions x and y, respectively. This means that only one fourth of the operations have to be carried out. Then, in the position judged best, the match is examined in a one-pixel-point environment, to have the exact result. The practical experience is that, for three squares, the relative positional offset values will not be fully identical. The three offset values are compared with a tolerance of a few pixels. If all three are similar, the offset values are averaged. If two are similar, but one is different, the two are averaged and the different one is discarded. If all three are different, we assume that no usable offset value could be calculated, the relevance of which will be discussed later. The calculation of relative positional offset values usually does not work in empty or homogenous areas, but neither are the relevant problems discernible there.

In the next step of the method, the offset goodness value of the adjoining edges of two image blocks is calculated. Notably, it is important, for the final stitching of the image, to know not only the relative positional offset value of two image blocks, but also the degree of its reliability. For this purpose, a goodness value is introduced. Goodness is simply the sum of the absolute values of the pixel differences between the square and the image block, the same figure as was used to identify the region, which the small square resembles most. The final value is the average of the smallest difference values (final position) of the squares taken into consideration for the offset.

This value is then divided by the number of the pixels of the square, and subtracted from 1. If the squares are perfectly identical in both image blocks 1, 2, the goodness value will be 1 (zero difference), and if they are completely different, it will be 0. If the offset value cannot be calculated on the basis of the position of the squares, as referred to earlier, preferably a theoretical offset value is taken into account, and the goodness value is set at 0 in that case, too.

Figure 2:
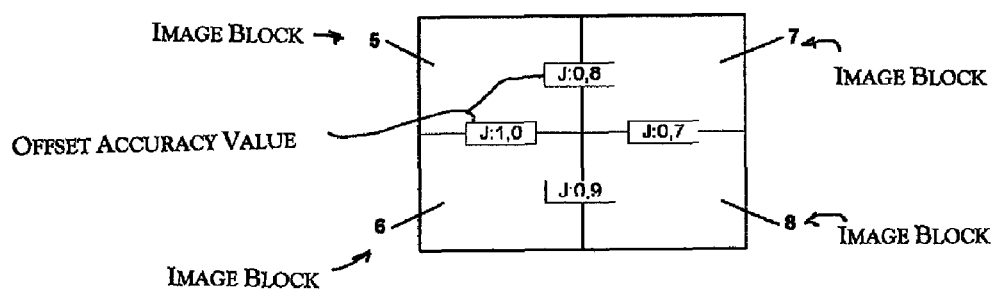
FIG. 2 shows the difficulties of stitching together several image blocks characterised by different offset goodness values, FIG. 3 outlines the stitching errors of image blocks surrounding a non-scanned region.

The next step of the method consists of stitching and optimising image blocks 1, 2. Image blocks 1, 2 are stitched together so that the two edges of image blocks 1, 2 characterised by the best offset goodness values J (see FIG. 2) are stitched together first, and the two edges of image blocks 1, 2 characterised by the worst offset goodness values last. It is advantageous to proceed this way because the stitching of image blocks 1, 2 is most likely to produce "image block isles". For example, in the arrangement shown in FIG. 2, the best offset with J=1 is the one between image blocks 5, 6 occurring on the left-hand side, one below the other, and the second best with J=0,9 occurs between image blocks 6, 8 positioned side by side at the bottom. Although, in this case, after step 2 the four image blocks 5-8 have already been stitched together, the two two-block isles are far away from one another. Hence stitching will either produce new image block isles or fatten the existing ones. At the end, these will probably be linked by weak image block edges, but this is no problem.

One of the essential advantages of the method is that it does not actually move image blocks 1, 2, it does not copy pixels, but carries out the operations concerned in a matrix, where only the co-ordinates of image blocks 1, 2 are modified.

Figure 3:
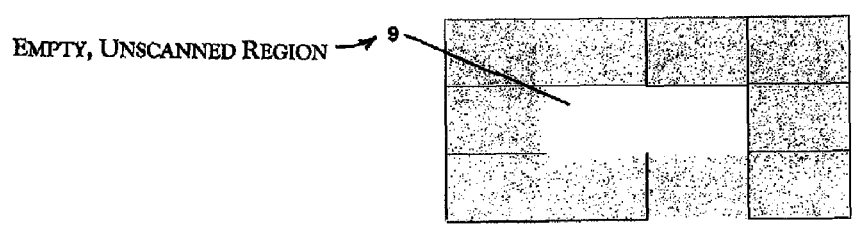

Some very serious errors may prevail after having modified the co-ordinates of every image block 1, 2 in the order of goodness of the offsets, as in the following example: First image blocks 5 and 6 were stitched together, because their offset goodness value was 1.0. Subsequently, image blocks 6 and 8, and finally 5 and 7 were stitched together, but as the co-ordinates of image blocks 7 and 8 have been adjusted, directly or indirectly, to image block 5, the relative positional offset value calculated between image blocks 7 and 8 is not necessarily identical with the other offset values calculated in several steps. This is all the more so in those cases where the image blocks corresponding to the view fields enclose an empty, un-scanned, region 9, as in FIG. 3. Presumably, there is always a 0.5 pixel error in offset calculations, as we calculate with entire pixels only, whereas in reality the errors are certainly not exactly a full pixel size. Even if the offset goodness values are very good indeed, if an empty region 9 is enclosed, the errors in the two directions may add up, and result in a difference at the meeting point.

Contradictions, errors—tensions, differences—generated in the course of the stitching process may be entered, for example, in two more tables. If the difference between the coordinates of two image blocks 1, 2 is identical with the calculated offset value, we shall indicate 0 in the tables. If there is a difference, the X and Y components of the difference are entered in the first and the second table, respectively.

In accordance with the invention, errors are distributed over several image blocks, to have 1-pixel-size errors at 20 places instead of having a 20-pixel-size error at one place. Errors cannot be less than 1 pixel. We go through the two tables in several steps, until the error is reduced to 1 everywhere.

Table 1 shows the errors in direction X. Every error figures twice: once with a plus and once with a minus sign. This is due to the fact that we calculate for every image block its error relative to its next neighbour. +4 means that the given image block must be shifted to the right by 4 pixels to fit perfectly to the subsequent image block, while −4 means that the given image block must be shifted by 4 pixels to the left so that it should fit to the subsequent image block perfectly.

TABLE 1

| 0 | 0 | 0 | 0 | 0 |
|---|---|---|---|---|
| 0 | 0 | 0 | 0 | 0 |
| 0 | 0 | 4 | -4 | 0 |
| 0 | 0 | 0 | 0 | 0 |
| 0 | 0 | 0 | 0 | 0 |

Errors are distributed, advantageously, for example by dividing every error of a value exceeding 1 by 2 as a first step. Then we calculate the errors after the fine-tuning of the positions of the image blocks by the values remaining in the table. Then the calculation is reiterated until every error value is reduced to 1. If necessary, downward rounding is applied in the course of the divisions.

If the image blocks have neighbours in both directions, and there are errors in both directions relative to the next neighbour image block, the bigger one of these errors is entered in the table.

Figure 4:
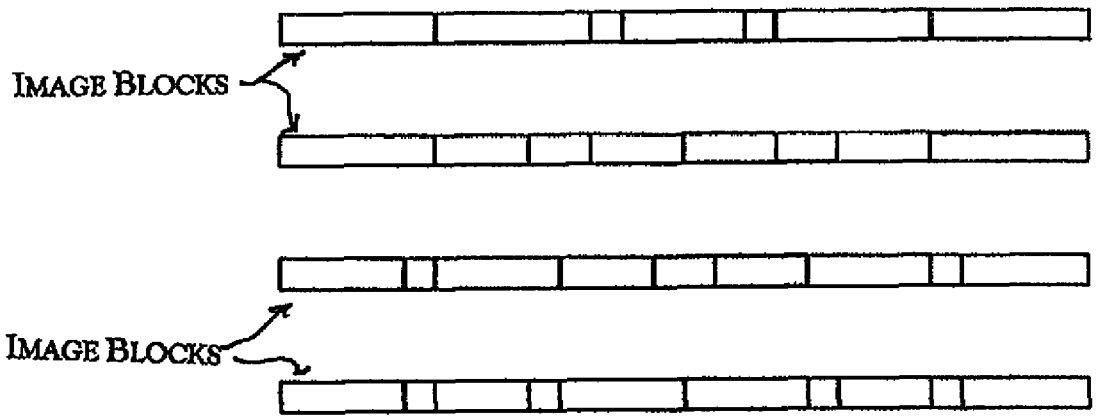
FIG. 4 shows a possible method according to the present invention for reducing offset errors.

The above is shown by way of example on Line 3 of Table 1, with the help of FIG. 4. The rectangles represent image blocks of 5×1 pixels each. Ideally, the rectangles are located side by side, or overlap by maximum 2 pixels.

| | | | | | | |
|---|---|---|---|---|---|---|
| Initial position, calculated overlap values (errors) | 0 | 0 | -4 | 4 | 0 | 0 |
| Errors halved and rectangles offset by that value | 0 | 0 | -2 | 2 | 0 | 0 |
| Calculated errors of the first iteration phase | 0 | -2 | 2 | -2 | 2 | 0 |
| Errors halved and rectangles offset by that value | 0 | -1 | 1 | -1 | 1 | 0 |
| Calculated errors of the second iteration phase | -1 | 1 | -2 | 2 | -1 | 1 |
| Errors halved and rectangles offset by that value | 0 | 0 | -1 | 1 | 0 | 0 |
| Calculated error*s of the third iteration phase | -1 | 1 | 1 | -1 | 1 | 1 |
| Errors halved and rectangles offset by that value | 0 | 0 | 0 | 0 | 0 | 0 |

As a last step of the method, the image stitched together from the image blocks is shown. The individual image blocks cannot be kept in the memory throughout the digitalisation process, as they do not fit into it, and a posteriori modifications would take a very long time. Therefore, the image blocks are saved as soon as possible. Given the fact that, beyond the calculation of the relative positional offset value of two image blocks, every other operation described above can be performed exclusively with the help of the co-ordinates and, therefore, the co-ordinates are kept in the memory throughout the process, and, after the last optimisation, they are entered in the file of the entire image. In the showing process, these co-ordinates are read and the entire image is displayed at the end accordingly, on a display screen, for example.

In an advantageous embodiment, any eventual residual errors will be cleaned by blending the overlapping regions of the image blocks. This can be done, for example, by showing the pixels of the left-side image block in 100% on the left side of the overlap, and the pixels of the right-side image block on its right side in 100%, and by altering the weight of the pixels in the intermediary region in direct proportion with their position.

Figure 5:
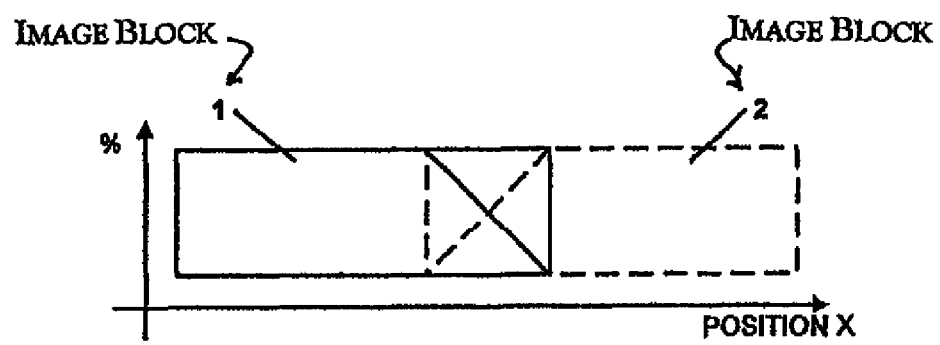
FIG. 5 shows the blurring of the remaining overlapping areas of the image blocks.

FIG. 5 shows two overlapping image blocks 1, 2 with continuous and dotted lines, respectively. The slanting lines represent the relative contributions of the pixels of image blocks 1, 2 to creating the image.

The foregoing merely illustrates the principles of the invention. It will thus be appreciated that those skilled in the art will be able to devise numerous other arrangements which embody the principles of the invention and are thus within its spirit and scope. The embodiments described above and depicted in the figures are not meant to be limiting, but rather illustrative of the invention that is to be limited only by the appended claims.

According to an alternative of the method the selected three regions 4 offering the highest-definition image blocks are moved together instead of being moved separately because both image blocks 1, 2 have the same pattern so that the identical features are positioned in the same manner relative to each other. In this way, by simultaneous moving the regions 4 better results can be achieved then in case of individual shifting. This variant eliminates the requirement of measuring of the displacement of the three regions 4, only the similarity shall be determined.

According to a further alternative of the present method the size of the squares constituting the regions 4 is choosen to 16×16 pixels and more than three regions 4 are selected and processed depending on the scanning quality of the image blocks 1, 2 and the zooming factor.

What is claimed is:

1. A method for realistic stitching and showing image blocks of an electronically recorded multipart image whereas relative positional offset values of the image blocks recorded with overlap are determined in a co-ordinate system in directions x and y and stored in matrix format, and the image blocks to be shown are stitched together on the basis of the stored values, the method comprising the steps of:
   subdividing the overlaps of the individual image blocks into smaller regions;
   picking up at least one region most useful for the determination of the stitching;
   identifying a main offset direction vector related to the offset value on the basis of the regions;
   determining an offset goodness value in addition to a relative positional offset value;
   stitching together blocks of the image so that first the two image blocks characterised by the best offset goodness values are stitched together and the two image blocks characterised by the worst offset goodness values are stitched together last, and only the co-ordinates of the images figuring in a table are modified in the course of the stitching process;
   distributing errors produced by the stitching process over several image blocks, and, further comprising the step of:
   selecting at least two image regions offering the highest-definition image blocks from among the smaller regions while searching for at least one region that is most useful for defining the stitching.

2. The method according to claim 1, comprising the additional step of calculating a definition of the smaller regions after the subdivision of the overlaps of the image blocks into smaller regions.

3. A method for realistic stitching and showing image blocks of an electronically recorded multipart image whereas relative positional offset values of the image blocks recorded with overlap are determined in a co-ordinate system in directions x and y and stored in matrix format, and the image blocks to be shown are stitched together on the basis of the stored values, the method comprising the steps of:
   subdividing the overlaps of the individual image blocks into smaller regions;
   picking up at least one region most useful for the determination of the stitching;
   identifying a main offset direction vector related to the offset value on the basis of the regions;

determining an offset goodness value in addition to a relative positional offset value;

stitching together blocks of the image so that first the two image blocks characterised by the best offset goodness values are stitched together and the two image blocks characterised by the worst offset goodness values are stitched together last, and only the co-ordinates of the images figuring in a table are modified in the course of the stitching process;

distributing errors produced by the stitching process over several image blocks, and, further comprising the step of: identifying the main offset direction vector by picking up selected regions in the other image block involved in the overlap, so that the selected regions are compared in every pixel position on the basis of the absolute value of pixel differences with the other image block, and will qualify as fitting best at the position characterised by the smallest difference; then the offset goodness values of the selected regions are compared and, in case of similarity, the offset values are averaged.

4. A method for realistic stitching and showing image blocks of an electronically recorded multipart image whereas relative positional offset values of the image blocks recorded with overlap are determined in a co-ordinate system in directions x and y and stored in matrix format, and the image blocks to be shown are stitched together on the basis of the stored values, the method comprising the steps of:

subdividing the overlaps of the individual image blocks into smaller regions;

picking up at least one region most useful for the determination of the stitching;

identifying a main offset direction vector related to the offset value on the basis of the regions;

determining an offset goodness value in addition to a relative positional offset value;

stitching together blocks of the image so that first the two image blocks characterised by the best offset goodness values are stitched together and the two image blocks characterised by the worst offset goodness values are stitched together last, and only the co-ordinates of the images figuring in a table are modified in the course of the stitching process;

distributing errors produced by the stitching process over several image blocks, and, further including the step of determining the sum of the absolute values of the pixel differences between the selected region and the image block in the course of the determination of the offset goodness value, by dividing the average of the smallest difference values of the regions taken into account for the offset with the pixel number of the region, and subtracting it from 1.

5. The method according to claim 1, further comprising: the further step of entering the errors produced by the stitching over several image blocks into a table during the distribution of errors step.

6. The method according to claim 1, wherein the smaller regions are squares.

7. The method according to claim 6, wherein the squares have a size ranging from about 16×16 pixels to about 64×64 pixels.

8. The method according to claim 1, wherein three regions offering the highest-definition image blocks are selected from among the smaller regions.

9. The method according to claim 2, wherein the definition is calculated by subtracting intensity values of next-neighbour pixels from one another, taking the absolute value thereof, and adding up the absolute values.

10. The method according to claim 2, wherein for the purpose of definition calculation, instead of taking into account a pixel next to a given pixel, one pixel that is at a distance of several pixels away is used.

11. The method according to claim 10, wherein the distance of the pixel used for the calculation is defined as a function of optical resolution.

12. The method according to claim 11, wherein when there is a higher resolution, a more distant pixel is taken into account.

13. The method according to claim 1, wherein in the course of the search for the selected image blocks in the other image block involved in the overlap, optimisation is carried out, so that only every other pixel position is examined in directions x and y, respectively, and in order to produce an exact result, in the position judged best, the fitting is examined in a one-pixel vicinity as well.

14. The method according to claim 1, further including the steps of comparing the offset goodness values of the selected regions, in case of two similar and one different offset values, the two similar ones are averaged and the different one is discarded.

15. The method according to claim 1, wherein if no offset goodness value can be determined, a theoretical offset goodness value will be taken into account.

16. The method according to claim 1, wherein in the course of the determination of the offset goodness value, when an offset goodness value cannot be calculated on the basis of the positions of the regions, the offset goodness value will be set at zero.

17. The method according to claim 15, wherein the theoretical offset value is taken into account with zero offset goodness value.

18. The method according to claim 1, wherein when distributing the errors over several image blocks, pixel errors are divided, in several steps, until the error is reduced everywhere to a value corresponding to one pixel.

19. The method according to claim 18, wherein when distributing the errors, in one step, every error exceeding 1 is divided by 2, and then the size of the error after refining the position of the image blocks with the values remaining in the table is calculated, and subsequently, we return to the beginning and reiterate the process until the value of every error is reduced to 1.

20. The method according to claim 19, wherein downward rounding is applied for the divisions.

21. The method according to claim 19, wherein if there is an error relative to the next neighbour image block in both directions, then the bigger error will be entered in the table.

22. The method according to claim 1, including the additional steps of cleaning remaining errors and blending the overlaps of the image blocks so that on the left side of the overlap, the pixels of the left-side image block are shown 100%, on the right side of the overlap, the pixels of the right-side image block are shown 100%, and in the intermediary regions, the weights of the pixels are altered in direct proportion with their position.

* * * * *